(12) United States Patent
Son (10) Patent No.: US 11,920,693 B1
(45) Date of Patent: Mar. 5, 2024

(54) U MOTION GATE VALVE

(71) Applicant: SRT CO., LTD, Hwaseong-si (KR)

(72) Inventor: Yeongman Son, Hwaseong-si (KR)

(73) Assignee: SRT Co., LTD, Hwaseong-si (KR)

( * ) Notice: Subject to any disclaimer, the term of this patent is extended or adjusted under 35 U.S.C. 154(b) by 0 days.

(21) Appl. No.: 18/204,096

(22) Filed: May 31, 2023

(30) Foreign Application Priority Data

Mar. 14, 2023 (KR) ........................ 10-2023-0033456

(51) Int. Cl.
*F16K 3/18* (2006.01)
*F16K 51/02* (2006.01)

(52) U.S. Cl.
CPC ................ *F16K 3/18* (2013.01); *F16K 51/02* (2013.01)

(58) Field of Classification Search
CPC ............. F16K 3/18; F16K 3/188; F16K 51/02
See application file for complete search history.

(56) References Cited

U.S. PATENT DOCUMENTS

| 4,157,169 | A | * | 6/1979 | Norman | F16K 3/188 |
| | | | | | 251/63.6 |
| 4,721,282 | A | * | 1/1988 | Shawver | F16K 51/02 |
| | | | | | 251/193 |
| 5,566,922 | A | * | 10/1996 | Tanaka | F16K 3/188 |
| | | | | | 251/157 |
| 6,056,266 | A | * | 5/2000 | Blecha | F16K 3/0218 |
| | | | | | 251/193 |
| 6,899,316 | B2 | * | 5/2005 | Duelli | F16K 3/188 |
| | | | | | 251/158 |
| 6,913,243 | B1 | * | 7/2005 | Tomasch | F16K 51/02 |
| | | | | | 414/217 |
| 7,445,019 | B2 | * | 11/2008 | Brenes | F16K 3/188 |
| | | | | | 251/193 |
| 7,611,122 | B2 | * | 11/2009 | Tichy | F16K 31/122 |
| | | | | | 251/193 |
| 8,807,527 | B2 | * | 8/2014 | Kim | F16K 3/188 |
| | | | | | 137/553 |
| 8,827,241 | B2 | * | 9/2014 | Geiser | F16K 3/188 |
| | | | | | 251/193 |
| 9,404,589 | B2 | * | 8/2016 | Ishigaki | F16K 31/12 |
| 9,587,749 | B2 | * | 3/2017 | Rice | F16K 3/0236 |
| 9,765,897 | B2 | * | 9/2017 | Jee | F16K 31/122 |
| 9,791,052 | B2 | * | 10/2017 | Blecha | F16K 3/16 |
| 9,976,655 | B2 | * | 5/2018 | Ehrne | F16K 3/182 |
| 10,184,291 | B2 | * | 1/2019 | Blecha | E06B 5/10 |
| 10,302,225 | B2 | * | 5/2019 | Ehrne | F16K 3/188 |
| 10,364,899 | B2 | * | 7/2019 | Albrecht | F16K 3/12 |
| 10,563,775 | B2 | * | 2/2020 | Kim | F16K 3/0254 |
| 11,149,860 | B2 | * | 10/2021 | Kimori | F16K 37/0041 |
| 11,209,092 | B2 | * | 12/2021 | Iwabuchi | F16K 1/303 |
| 11,328,943 | B2 | * | 5/2022 | Kuppannan | F16K 3/18 |
| 11,543,051 | B2 | * | 1/2023 | Böhm | F16K 51/02 |

(Continued)

FOREIGN PATENT DOCUMENTS

KR 100804589 B1 * 2/2008
KR 101684881 B1 * 12/2016

*Primary Examiner* — David Colon-Morales
(74) *Attorney, Agent, or Firm* — NSIP Law (57) ABSTRACT

The present invention relates to a U Motion gate valve that maintains a tight seal on the outlet side when closing the valve through U Motion operation in the state that the tip and end of the main shaft are free ends using the principle of the class 3 lever.

6 Claims, 8 Drawing Sheets

(56) References Cited

U.S. PATENT DOCUMENTS

| | | | |
|---|---|---|---|
| 11,788,630 B2 * | 10/2023 | Schaltegger | F16K 31/122 251/60 |
| 2012/0247564 A1 * | 10/2012 | Kho | F16K 3/188 251/318 |
| 2023/0094622 A1 * | 3/2023 | Hiroki | F16K 3/18 118/729 |
| 2023/0139315 A1 * | 5/2023 | Nishikawa | F16K 3/184 |
| 2023/0151891 A1 * | 5/2023 | Schön | F16K 3/18 251/85 |

\* cited by examiner

U MOTION GATE VALVE

CROSS-REFERENCE TO RELATED APPLICATIONS

This application claims the benefit under 35 USC 119(a) of Korean Patent Application No. 10-2023-0033456, filed with the Korean Intellectual Property Office on Mar. 14, 2023, the entire disclosure of which is incorporated herein by reference in its entirety.

TECHNICAL FIELD

The present disclosure relates to a U Motion gate valve, and more particularly, to a U Motion gate valve that maintains a tight seal on the outlet side.

BACKGROUND

In general, since semiconductors require process density, high cleanliness and special manufacturing technology are required.

For this reason, semiconductor devices are manufactured in a vacuum state that can most completely block contact with foreign substances contained in the air, and sealing technology between the vacuum working area of semiconductor manufacturing equipment and atmosphere also have a great influence on the quality of semiconductor products.

Gate valves of various shapes are installed in the process section for manufacturing the semiconductor as described above to perform a function of transferring or blocking the gas passing through the cleaning module between chambers.

In a state where the inlet or outlet is coupled between the process chamber and the process chamber, respectively, the outlet or inlet is coupled to each other, and the blade, which is a sealing member, opens and closes the corresponding inlet according to the driving of the cylinder, such that the gate valve as described above operates to pass or block gas to the outlet.

These gate valves have been manufactured and published in various forms, among which Patent Document 1 "Gate Valves for Semiconductor and LCD Vacuum Equipment (Korean Patent Registration No. 10-0804589)" is disclosed.

"Gate valve for semiconductor and LCD vacuum equipment" of the Patent Document 1 is characterized in that it consists of a body part having a main body in which an inlet pipe and an outlet pipe are formed facing each other and a first chamber connected to the inlet pipe and the outlet pipe and a second chamber connected to the first chamber are formed therein; a drive part having a pneumatic cylinder coupled to the outside of one side of the main body and a cylinder rod extending toward the inside of the main body; and a gate part having a first blocking disk and a second blocking disk disposed inside the main body, connected to the cylinder rod, disposed in the second chamber when the valve is opened, and disposed in the first chamber when the valve is closed to block the inlet pipe and the discharge pipe, and a protection plate blocking contact between the highly corrosive fluid and the first blocking disk and the second blocking disk disposed in the second chamber when the valve is opened, and due to this, there is an advantage in that the life of the valve can be extended by minimizing the contact between the highly corrosive fluid and the first blocking disk and the second blocking disk.

Meanwhile, as in "Gate Valve (Korean Registered Patent Publication No. 10-1684881)" of Patent Document 2, in the state in which the bellows of Patent Document 1 is applied to the shaft of Patent Document 2, when the shaft part moves horizontally and then vertically by the drive part to seal the valve, and the sealing plate closes the inflow path, in a state where the end of the shaft part is fixedly coupled to the drive part, a force is applied to the sealing plate toward the inflow passage, resulting in a so-called lateral deflection phenomenon (Lattral) in which the tip of the bellows is bent, and due to this, there was a problem that the sealing operation of the sealing plate was not completely performed as a repulsive force was generated in the bellows, which was usually made of SUS material, such that the inflow path was not sealed.

SUMMARY

The present invention has been made to solve the above problems, and an object of the present invention is to provide a U Motion gate valve capable of maintaining a tight closed state by offsetting the repulsive force of the bellows due to lateral deflection (Lattral) through the adhesion of the tip of the main shaft and the support of the end of the main shaft, when closing the valve with U Motion operation using the principle of the class 3 lever, it is configured such that a fulcrum point acts at the end of the main shaft, a force point acts at the center of the main shaft, and a applying point acts at the tip of the main shaft to seal the outlet.

In order to solve the above problems, the U Motion gate valve according to the present invention is characterized in that it consists of a housing 100 in which a space is formed on the inside, a first passing hole 110 is formed on the frontside, and a second passing hole 120 is formed on the backside; a valve block 200 formed on the front of the housing 100, having an inlet 210 at an upper portion, an outlet 220 at a lower portion, and a fluid flow path 200 formed on the inside; a movement guide sheet 300 formed inside the housing 100 and having a shaft insertion hole 310 perforated; a bellows 400 formed on the front of the movement guide sheet 300; a main shaft 500 sequentially inserted into the second passing hole 120, the shaft insertion hole 310, the bellows 400, and the first passing hole 110; a sealing blade 510 formed at the tip of the main shaft 500 to open and close the outlet 220; a vertical cylinder 600 coupled to the movement guide sheet 300 to raise or lower the movement guide sheet 300 according to whether it is driven or not; and a horizontal cylinder 700 connected to the movement guide sheet 300 to advance or reverse the movement guide sheet 300 according to whether it is driven or not, and to guide the movement guide sheet 300 upward or downward according to whether the vertical cylinder 600 is driven or not.

Moreover, it is characterized in that a tip and an end of the main shaft 500 are formed as free ends, and the sealing blade 510 closes the outlet 220 in a state where the end of the main shaft 500 is supported on an inner bottom surface 121 of the second passing hole 120 when the main shaft 500 descends by the driving of the vertical cylinder 600 in a state where the main shaft 500 is advanced by the driving of the horizontal cylinder 700.

Moreover, it is characterized in that characterized in that at the end of the main shaft 500, in a state where the main shaft 500 is moved forward by the driving of the horizontal cylinder 700 and the end of the main shaft 500 is located in the second passing hole 120, a support block 520 is formed to be supported on the inner bottom surface 121 of the second passing hole 120 when the main shaft 500 descends by the driving of the vertical cylinder 600.

Moreover, it is characterized in that a pair of horizontal movement blocks 320 are formed at an upper portion of the movement guide sheet 300, and the vertical cylinder 600 is provided with a pair of first pistons 610 including two pairs of first piston rods 611 and a pair of guide rails 620 coupled to the horizontal movement block 320 at a lower portion of the two pairs of the first piston rods 611.

Moreover, it is characterized in that a pair of insertion holes 330 are perforated on both sides of the movement guide sheet 300, and the horizontal cylinder 700 is provided with a second piston 710 including a second piston rod 711, a moving clip 720 formed at the of the second piston rod 711, and a pair of lifting guide pins 730 on both sides of the moving clip 720 to be inserted into the pair of insertion holes 330.

Moreover, it is characterized in that a height adjustment block 800 is further formed at the inner bottom surface 121 of the second passing hole 120 to adjust the contact height between the support block 520 and the inner bottom surface 121 of the second passing hole 120.

As described above, according to the present invention, by using the principle of the class 3 lever, when the valve is closed through the U Motion operation in the state where the tip and the end of the main shaft are free ends, it has the advantage of maintaining a tight seal on the outlet side.

DETAILED DESCRIPTION

In the following, the U Motion gate valve according to an embodiment of the present invention will be described in detail with reference to the accompanying drawings. First, it should be noted that among the drawings, the same components or parts are indicated by the same reference numerals as much as possible. In describing the present invention, detailed descriptions of related well-known functions or configurations are omitted in order not to obscure the gist of the present invention.

Figure 1:
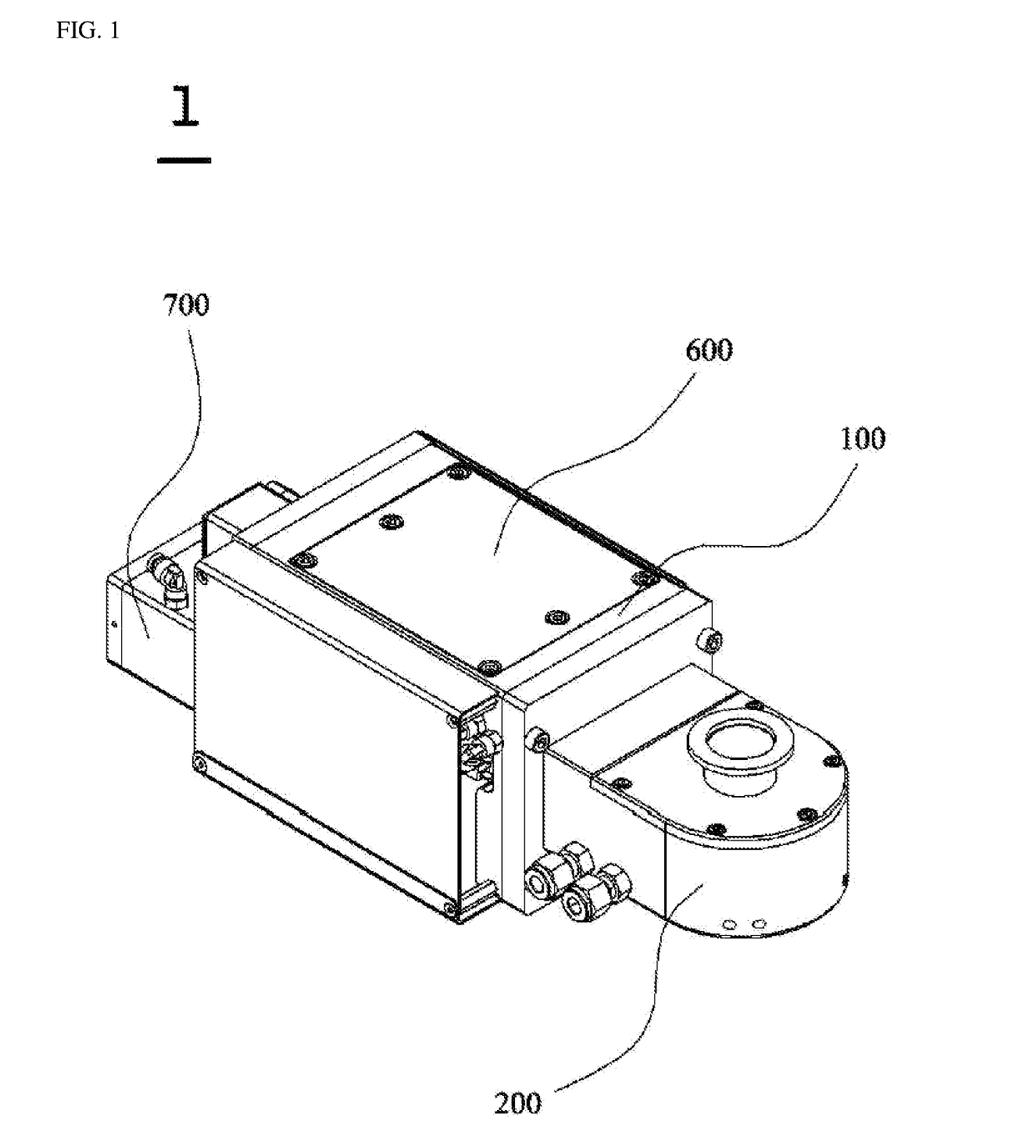
FIG. 1 is a perspective view showing the overall appearance of a U Motion gate valve according to a preferred embodiment of the present invention.
Figure 2:
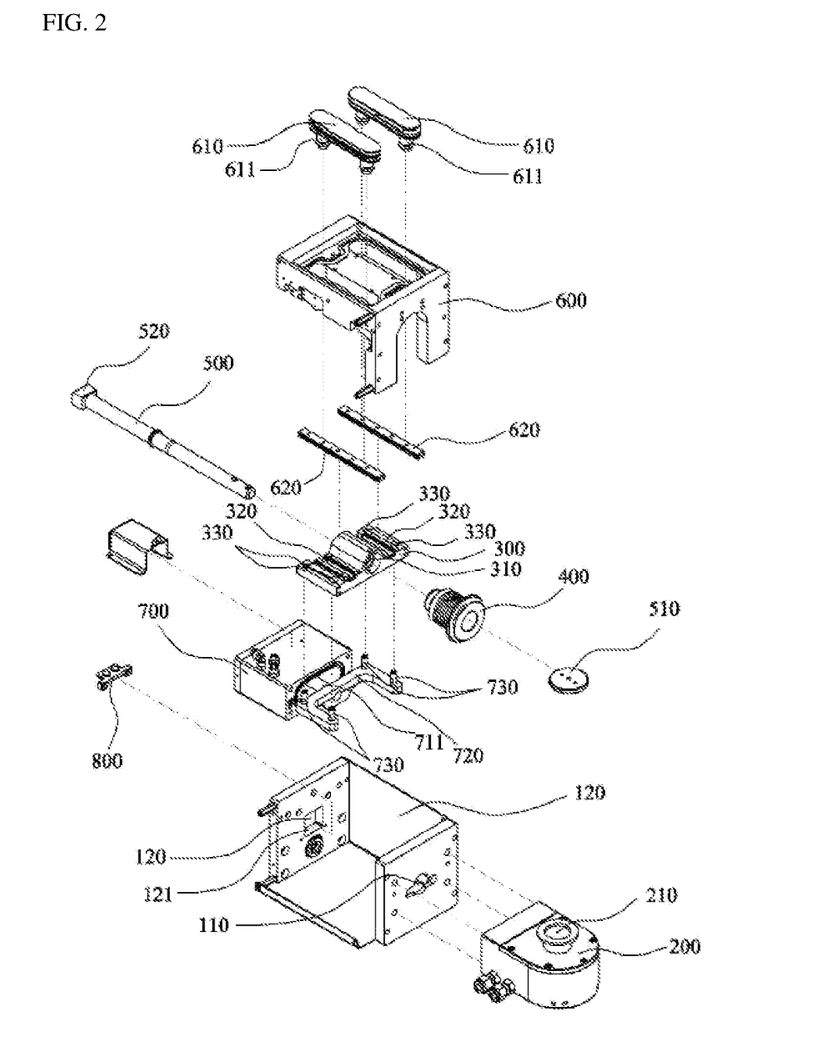
FIG. 2 is an exploded perspective view showing an exploded state of the U Motion gate valve according to a preferred embodiment of the present invention.
Figure 3:
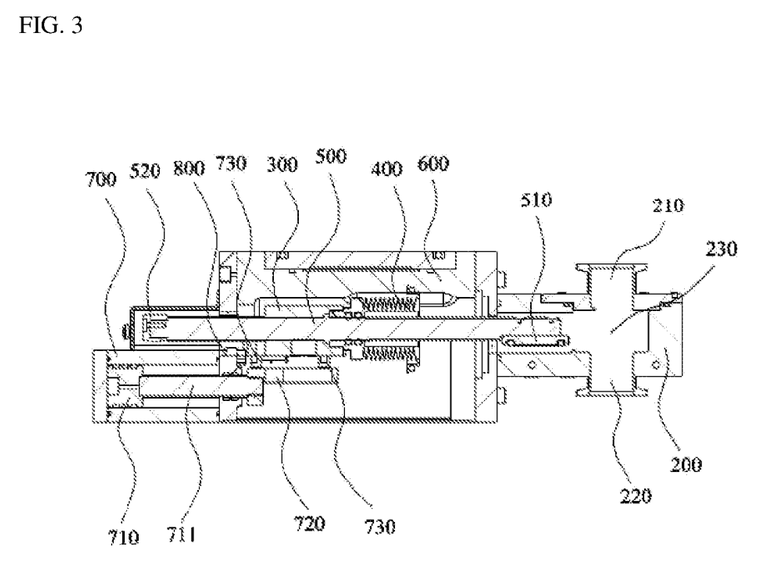
FIG. 3 is a cross-sectional view of the U Motion gate valve according to a preferred embodiment of the present invention.

Referring to FIG. 1, 2 or 3, the U Motion gate valve 1 according to an embodiment of the present invention is largely composed of a housing 100, a valve block 200, a movement guide seat 300, a bellows 400, a main shaft 500, a vertical cylinder 600, and a horizontal cylinder 700.

Figure 5:
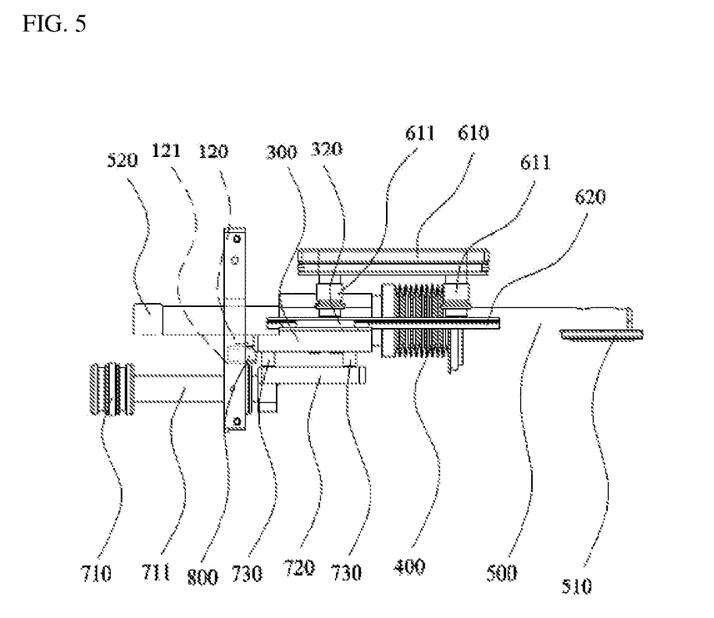
FIGS. 5 to 8 are examples showing the sealing operation of the U Motion gate valve according to a preferred embodiment of the present invention.

Prior to the description, it should be noted that some of the components of the present invention are omitted in some drawings for detailed and clear description of the present invention, and based on FIG. 5, the right direction is set to front/forward/tip, the left direction to rear/backward/end, the upper direction to upper/upward, and the lower direction to lower/downward.

First, the housing 100 will be described. As shown in FIG. 1, 2 or 3, the housing 100 is a component having a box shape, and a space is formed therein such that a movement guide sheet 300, a bellows 400, a main shaft 500, etc., which will be described later, are provided.

Meanwhile, on the front side of the housing 100, a first passing hole is perforated such that the main shaft 500 passes through and the tip of the main shaft 500 can be located inside the valve block 200 to be described later.

Moreover, on the rear side of the housing 100, a second passing hole is perforated such that when the main shaft 500 passes and the sealing blade 510, which will be described later, horizontally is placed in the sealing position of the outlet 220 to be described later.

Next, the valve block 200 will be described. As shown in FIG. 1, 2 or 3, the valve block 200 is closely coupled to the front of the housing 100 and is a component through which fluid such as process gas or cleaning gas moves between process chambers and process chambers or between process chambers and process pumps, wherein an inlet 210 through which fluid is brought in at the upper part of the valve block, an outlet 220 through which fluid is discharged at the lower part of the valve block, and a fluid flow path 230 formed as a space between the inlet 210 and the outlet 220 to guide the movement of the fluid from the inlet 210 to the outlet 220 are formed.

Figure 4:
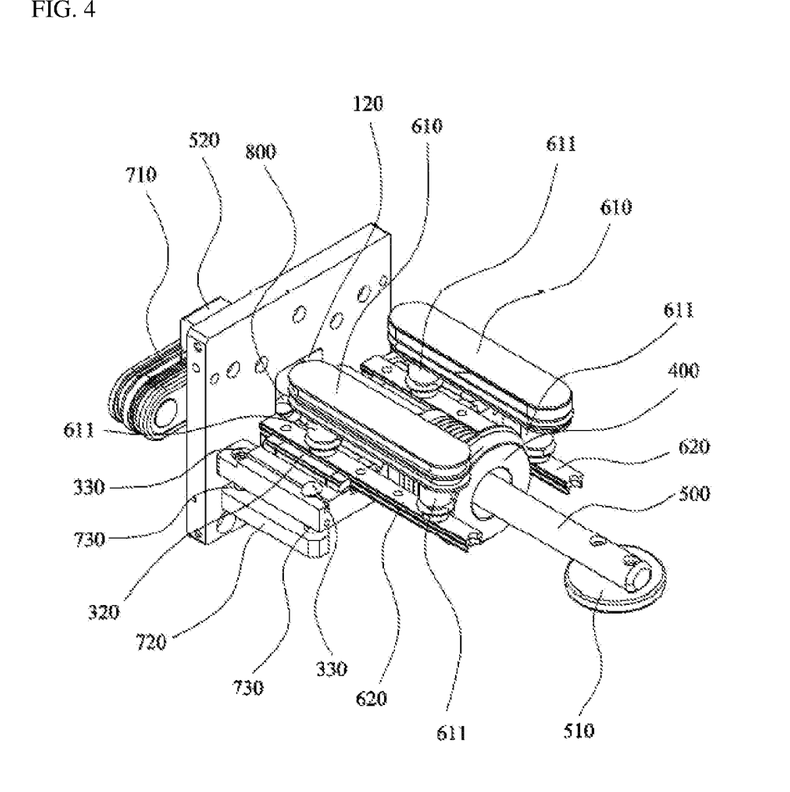
FIG. 4 is a perspective view showing a combination of a movement guide sheet, a bellows, a main shaft, a vertical cylinder and a horizontal cylinder among configurations of a U Motion gate valve according to a preferred embodiment of the present invention.

Next, the movement guide sheet 300 will be described. As shown in FIG. 2, 3 or 4, the movement guide sheet 300 is a component formed inside the housing 100 to guide horizontal movement and vertical movement of the main shaft 500, and it consists of a shaft insertion hole 310, a pair of horizontal movement blocks 320, and a pair of insertion holes 330.

The shaft insertion hole 310 is horizontally long perforated in the movement guide sheet 300, and the main shaft 500 is inserted and fixed.

The pair of horizontal movement blocks 320 are formed on both sides of the upper portion of the movement guide sheet 300 and is connected to a pair of guide rails 620 to be described later. Due to this, when the movement guide sheet 300 is moved forward or backward by the driving of the horizontal cylinder 700, accurate horizontal movement along the pair of guide rails 620 is possible.

The pair of insertion holes 330 are a kind of hole perforated on both sides of the movement guide sheet 300, into which a pair of lifting guide pins 730 to be described later is inserted. Due to this, when the movement guide sheet 300 is moved up or down by the driving of the vertical cylinder 600, accurate vertical movement along the pair of lifting guide pins 730 is possible.

Next, the bellows 400 will be described. As shown in FIG. 2, 3 or 4, the bellows 400, the bellows is tightly coupled between the front of the movement guide sheet 300 and the tip of the housing 100, and serves to prevent chemical damage from particles and harmful substances introduced into the housing 100 through the fluid flow path 230.

Next, the main shaft 500 will be described. As shown in FIG. 2, 3 or 4, the main shaft 500 is connected to the movement guide sheet 300 to guide the opening and closing of the outlet 220 by moving forward, backward, upward or downward according to the movement of the movement guide sheet 300, and it is preferably inserted in the order of the second passing hole, the shaft insertion hole, the bellows, and the first passing hole.

Figure 8:
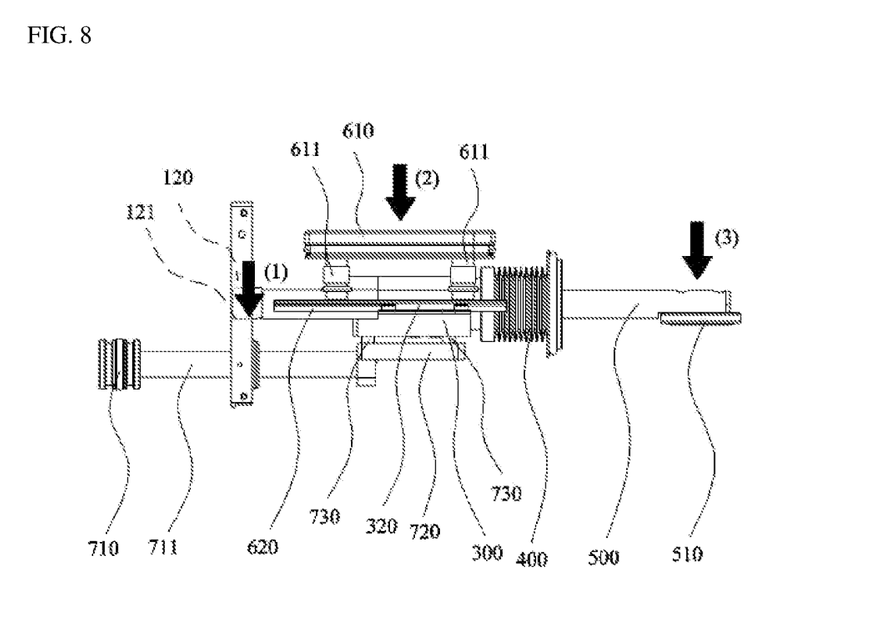

Meanwhile, in the present invention, when the vertical cylinder 600 is driven to close the outlet 220, the main shaft 500, as shown in FIG. 8, is formed to receive a driving force according to the principle structure of a class 3 lever.

That is, when the outlet 220 is closed in a state in which the tip and the end of the main shaft 500 are formed as free ends, the tip of the main shaft 500 becomes an applying point (3), the central side of the main shaft 500 becomes a force point (2) receiving the driving force of the vertical cylinder 600, and the end of the main shaft 500 becomes a fulcrum point (1) supported on the inner bottom surface 121 of the second passing hole 120.

Meanwhile, a sealing blade 510 for opening and closing the outlet 220 is formed at the tip of the main shaft 500.

Moreover, since the support block 520 is formed at the end of the main shaft 500, in a state where the main shaft 500 is moved forward by the driving of the horizontal cylinder 700 and the end of the main shaft 500 is located in the second passing hole 120, when the main shaft 500 descends by driving the vertical cylinder 600, it is possible to stably support the inner bottom surface 121 of the second passing hole 120.

Meanwhile, as a detachable height adjustment block 800 is further formed in the second passing hole 120, it is possible to adjust the contact height between the end of the main shaft 500 or the support block 520 and the inner bottom surface of the second passing hole 120, thereby responding to processing errors and assembly errors of the components of the present invention. This enables the realization of stable sealing performance with secured reliability.

Next, the vertical cylinder 600 will be described. As shown in FIG. 2, 3 or 4, the vertical cylinder 600 is a component coupled to the upper side of the movement guide sheet 300 to provide a driving force for raising or lowering the movement guide sheet 300 wherein the pair of first pistons 610 including two pairs of first piston rods 611 are formed therein.

Meanwhile, a pairs of guide rails 620 are formed below the two pairs of first piston rods 611 and connected to the pair of horizontal movement blocks 320, thereby guiding the accurate horizontal movement of the movement guide sheet 300 when the main shaft 500 moves forward or backward through the driving force of the horizontal cylinder 700.

Next, the horizontal cylinder 700 will be described. As shown in FIG. 2, 3 or 4, the horizontal cylinder 700 is a component coupled to the lower side of the movement guide sheet 300 to provide a driving force for moving the movement guide sheet 300 forward or backward, and to guide the movement guide sheet 300 upward or downward depending on whether the vertical cylinder 600 is driven wherein the second piston 710 including a second piston rod 711 is formed therein.

Moreover, a moving clip 720 is formed at the tip of the second piston rod 711 and is indirectly connected to the movement guide sheet 300 to guide forward or backward movement of the movement guide sheet 300, wherein the pair of lifting guide pins 730 are formed on both sides of the moving clip 720 and inserted into the pair of insertion holes 330, thereby allowing the main shaft 500 to move vertically.

In the following, with reference to FIGS. 5 to 7, an operation process when the outlet 220 of the U Motion gate valve 1 is closed according to a preferred embodiment of the present invention will be described.

First, as shown in FIG. 5, in a state in which the outlet 220 is open, the sealing blade 510 is spaced apart from the outlet 220 in vertical and horizontal directions, and the end of the main shaft 500 remains exposed to the outside of the housing 100.

Figure 6:
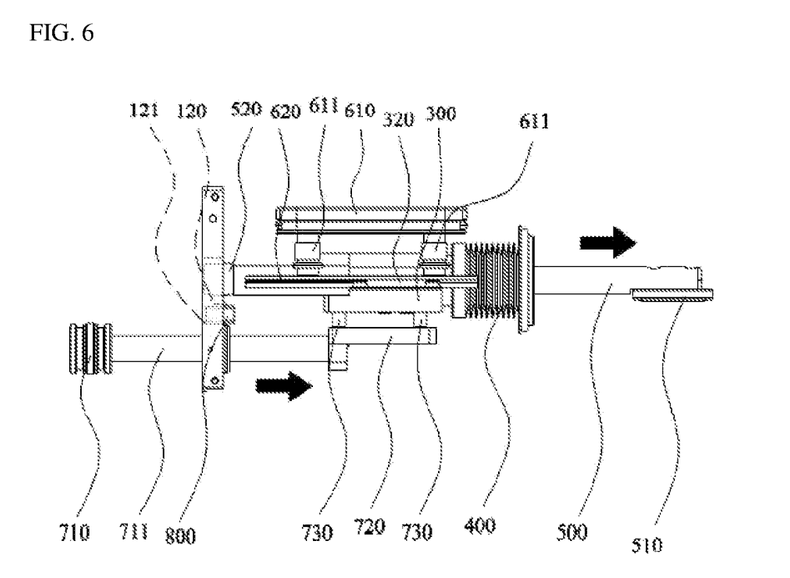

Then, as shown in FIG. 6, the horizontal cylinder 700 is driven to close the outlet 220.

When the horizontal cylinder 700 is driven, the movement guide sheet 300 moves in a horizontal direction along the pair of guide rails 620, and as a result, the main shaft 500 moves forward.

When the main shaft 500 is advanced to a position where the center of the sealing blade 510 coincides with the center of the outlet 220, the end of the main shaft 500 is positioned on the second passing hole 120.

Figure 7:
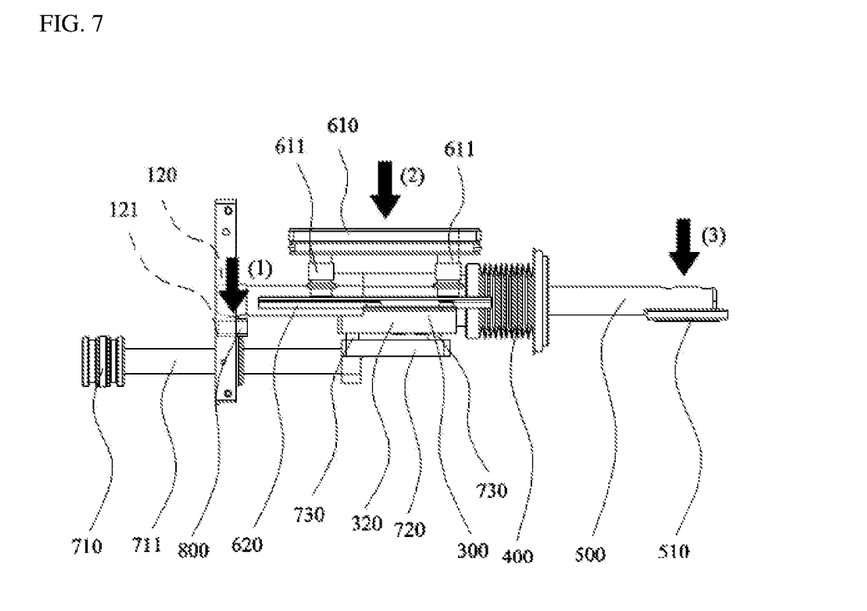

Next, as shown in FIG. 7, when the vertical cylinder 600 is driven, the movement guide sheet 300 moves in the vertical direction along the pair of lifting guide pins 730 inserted into the pair of insertion holes 330, and as a result, the main shaft 500 descends.

Meanwhile, when the main shaft 500 continues to descend by the driving force of the vertical cylinder 600, the sealing blade 510 comes into contact with the outlet 220 to seal the corresponding portion, and the end of the main shaft 500 comes into contact with the inner bottom surface 121 (or the top surface of the height adjustment block 800) of the second passing hole 120.

At this time, the front side of the bellows generates a lateral deflection (Lattral) due to contact with the inner surface of the housing or pressing the tip of the main shaft 500, and accordingly, a repulsive force occurs due to the material characteristics of the bellows 400. In this case, when the movement guide sheet 300 is pressed with strong pressure by increasing the driving force of the vertical cylinder 600, strong pressure is applied to the center of the main shaft 500 at the force point ((2)) receiving the driving force of the vertical cylinder 600, and the moment force generated in the direction of the applying point ((3)) centered on the force point ((2)) is greater than the moment force generated in the direction of the fulcrum point ((1)), through the pressing force transmitted to the side of the bellows 400 located at the tip of the main shaft 500, the repulsive force of the lateral deflection of the bellows 400 is offset, thereby making it possible to maintain a highly reliable and close sealed state.

Optimal embodiments have been disclosed in the drawings and specification. Although specific terms have been used herein, they are only used for the purpose of describing the present invention and are not used to limit the scope of the present invention described in the claims or defining the meaning. Therefore, those skilled in the art will understand that various modifications and equivalent other embodiments are possible therefrom. Thus, the true technical protection scope of the present invention should be determined by the technical spirit of the appended claims.

DESCRIPTION OF SYMBOLS

1: U Motion gate valve
100: Housing
110: First passing hole, 120: Second passing hole
200: Valve block Inlet
220: Outlet
230: Fluid flow path
300: Movement guide sheet
310: Shaft insertion hole
320: Horizontal movement block
330: Insertion hole
400: Bellows
500: Main shaft
510: Sealing blade
520: Support block

600: Vertical cylinder
610: First piston
611: First piston rod
620: Guide rail
700: Horizontal cylinder
710: Second piston
711: Second piston rod
720: Moving clip
730: Lifting guide pin
800: Height adjustment block

The invention claimed is:

1. A U Motion gate valve, comprising:
a housing in which a space is formed on the inside, a first passing hole is formed on the frontside, and a second passing hole is formed on the backside;
a valve block formed on the frontside of the housing, having an inlet at an upper portion, an outlet at a lower portion, and a fluid flow path formed on the inside;
a movement guide sheet formed inside the housing and having a shaft insertion hole perforated therein;
a bellows formed on the front of the movement guide sheet;
a main shaft sequentially inserted into the second passing hole, the shaft insertion hole, the bellows, and the first passing hole;
a sealing blade formed at a tip of the main shaft to open and close the outlet;
a vertical cylinder coupled to the movement guide sheet to raise or lower the movement guide sheet according to whether it is driven or not; and
a horizontal cylinder connected to the movement guide sheet to advance or reverse the movement guide sheet according to whether it is driven or not, and to guide the movement guide sheet upward or downward according to whether the vertical cylinder is driven or not.

2. The U Motion gate valve according to claim 1, characterized in that the tip and an end of the main shaft are formed as free ends, and the sealing blade closes the outlet in a state where the end of the main shaft is supported on an inner bottom surface of the second passing hole when the main shaft descends by the driving of the vertical cylinder in a state where the main shaft is advanced by the driving of the horizontal cylinder.

3. The U Motion gate valve according to claim 2, characterized in that a height adjustment block is further formed at the inner bottom surface of the second passing hole to adjust a contact height between a support block and the inner bottom surface of the second passing hole.

4. The U Motion gate valve according to claim 1, characterized in that at an end of the main shaft, in a state where the main shaft is moved forward by the driving of the horizontal cylinder and the end of the main shaft is located in the second passing hole, a support block is formed to be supported on an inner bottom surface of the second passing hole when the main shaft descends by the driving of the vertical cylinder.

5. The U Motion gate valve according to claim 1, characterized in that a pair of horizontal movement blocks are formed at an upper portion of the movement guide sheet, and the vertical cylinder is provided with a pair of first pistons including two pairs of first piston rods and a pair of guide rails coupled to the horizontal movement block at a lower portion of the two pairs of the first piston rods.

6. The U Motion gate valve according to claim 1, characterized in that a pair of insertion holes are perforated on both sides of the movement guide sheet, and the horizontal cylinder is provided with a second piston including a second piston rod, a moving clip formed at a tip of the second piston rod, and a pair of lifting guide pins on both sides of the moving clip to be inserted into the pair of insertion holes.

\* \* \* \* \*